United States Patent [19]

Sun et al.

[11] Patent Number: 5,432,877
[45] Date of Patent: Jul. 11, 1995

[54] INTEGRATED OPTICAL CIRCUIT HAVING A WAVEGUIDE END OF LENS GEOMETRY, AND METHOD FOR MAKING SAME

[75] Inventors: C. Jacob Sun, Worthington; Paul Davidson; Shin Sumida, both of Columbus, all of Ohio

[73] Assignee: Photonic Integration Research, Inc., Columbus, Ohio

[21] Appl. No.: 253,331

[22] Filed: Jun. 3, 1994

[51] Int. Cl.⁶ .................................. G02B 6/32
[52] U.S. Cl. ........................... 385/33; 385/132
[58] Field of Search ............... 385/31, 33, 35, 38, 385/49, 50, 129–132

[56] References Cited

U.S. PATENT DOCUMENTS

| | | | |
|---|---|---|---|
| 4,384,038 | 5/1983 | Khoe et al. | 385/132 X |
| 4,699,449 | 10/1987 | Lam et al. | 385/49 X |
| 4,943,129 | 7/1990 | Takeda et al. | 385/130 X |
| 5,064,266 | 11/1991 | Sun et al. | 385/132 |

*Primary Examiner*—John D. Lee
*Attorney, Agent, or Firm*—Porter, Wright, Morris & Arthur

[57] ABSTRACT

A method and apparatus are disclosed whereby integrated optical circuits having waveguide ends of lens geometry are formed which improve the waveguide's optical coupling to light sources and detectors. A channel waveguide is formed on a substrate and the waveguide ends are shaped into lens form by etching to form a protrusion and heating the waveguide to or above the softening temperature of core material of the waveguide resulting in surface tension in the core material that functions to shape the protrusion into a substantially cone-shaped lens end having a smooth surface.

25 Claims, 5 Drawing Sheets

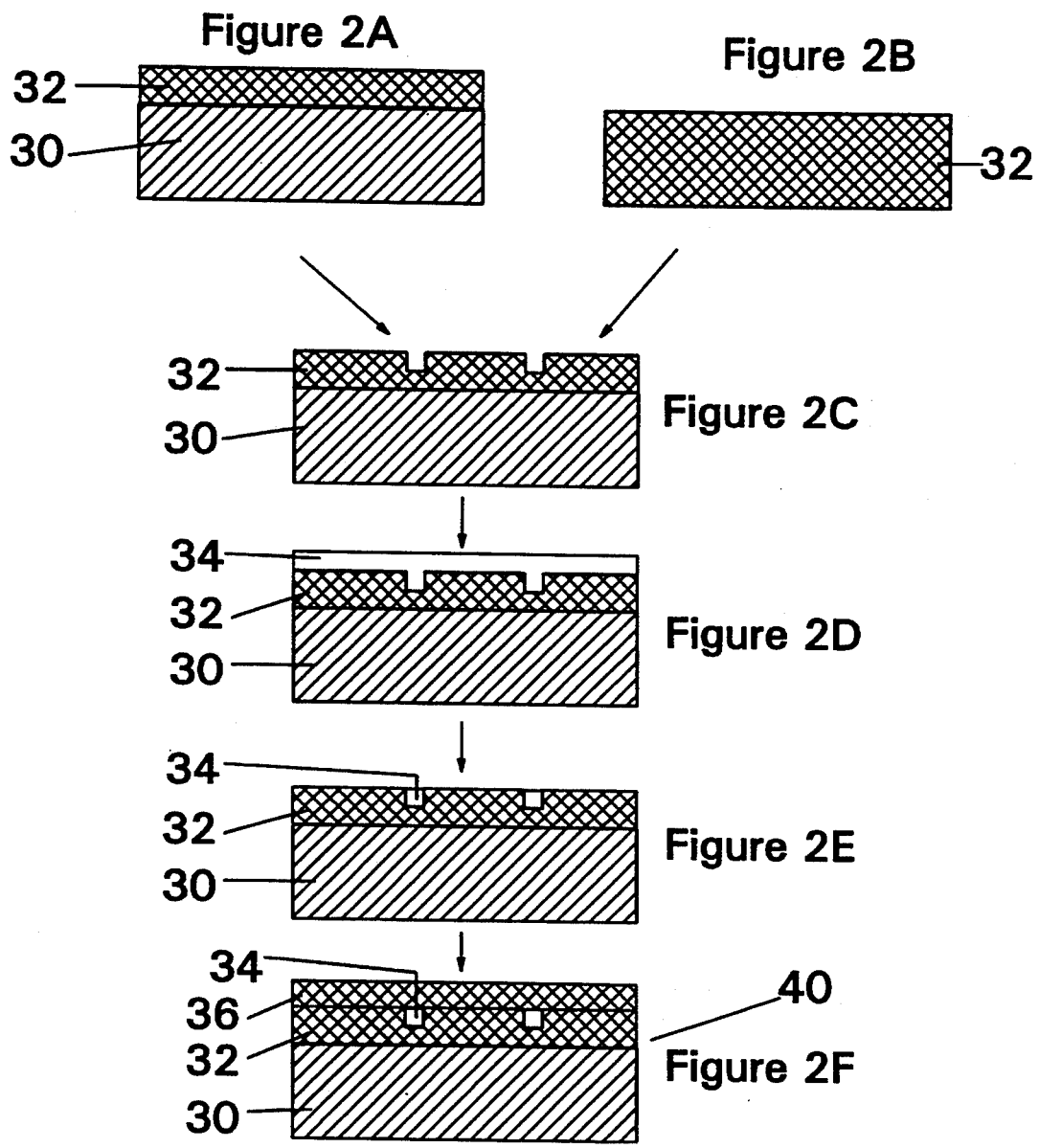

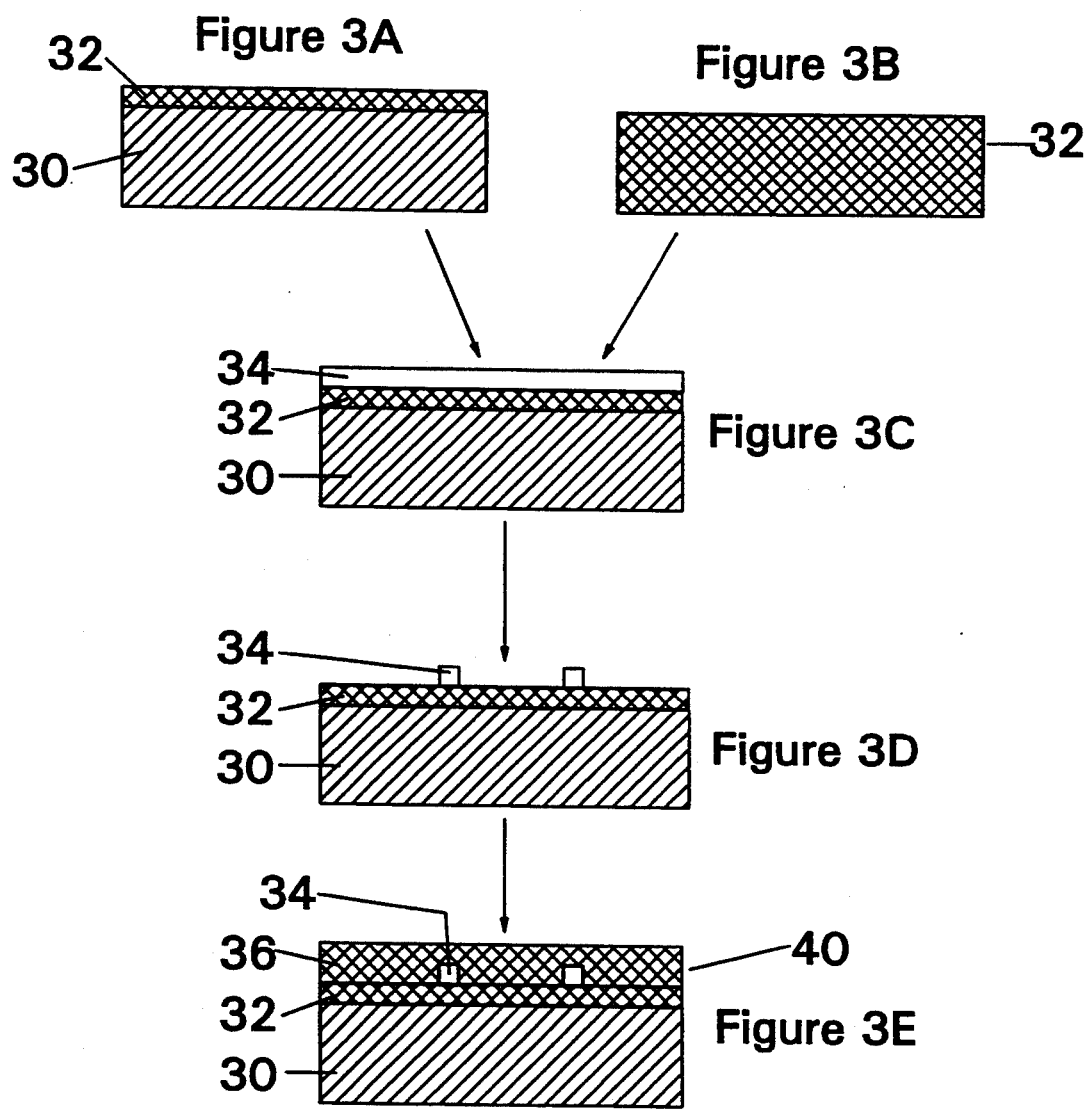

INTEGRATED OPTICAL CIRCUIT HAVING A WAVEGUIDE END OF LENS GEOMETRY, AND METHOD FOR MAKING SAME

FIELD OF THE INVENTION

This invention relates to optical waveguides, and more particularly to a method for making integrated optical circuits having waveguide ends of the lens geometry to improve the optical circuits' optical coupling to laser light sources and detectors.

BACKGROUND AND SUMMARY OF THE INVENTION

Typically, integrated waveguide circuits have flat cut or polished ends. The coupling efficiency between these waveguide circuits and a laser diode is low, typically less than 10%, because of the divergence of light from a laser diode. Discrete ball lenses or cylindrical bar lenses have been used to improve the coupling between laser diodes and waveguides but the discrete lenses are difficult to handle because of their small sizes. With the current invention, the lens is directly formed from the waveguide which eliminates the trouble of handling and aligning the lens with the waveguide.

Optical fibers with lens ends have been made to improve the coupling between laser diodes and fibers, but no planar process channel waveguides have been made with lens ends. Planar processed channel waveguides have different applications and functions than optical fibers.

In U.S. Pat. No. 5,064,266, having the common assignee of the present invention, lenses are formed monolithically with channel waveguides on the same substrate. The lenses are formed from "positive type" waveguides and the waveguide core is exposed to air during heating. Therefore, the core of the waveguide is always rounded while forming the lenses. With the present invention, the waveguide core other than the ends is enclosed in cladding during heating. The waveguide core retains its cross-sectional shape while the ends are made into lenses by heating. This enables the waveguide core to be of various shapes thus allowing many types of circuit design details to be accomplished.

The present invention offers other advantages over previously known methods and devices. The present invention enables better and relatively easier optical coupling from light sources, such as laser diodes, to waveguides and from waveguides to light detectors, such as photo diodes. This invention will be particularly useful in fiber optic communication and optoelectronic integration. The integrated waveguide circuits made by the present invention have substantially cone-shaped lens ends with a smooth surface which improve the waveguide's optical coupling to light sources and detectors.

The method of the present invention to make integrated optical circuits having waveguide ends of lens geometry is based on the principal that the etching rate of doped material varies with the type of dopants and the dopant concentration. In accordance with the present invention, waveguide circuits are formed on a substrate and the waveguide ends are shaped into lens form. The formation of waveguide circuits on a substrate includes the formation of one or more channels in lower cladding, wherein the channels define a waveguide circuit configuration. The substrate may itself be lower cladding or lower cladding may be deposited on the substrate. In either situation, core material is deposited over the lower cladding to fill the channel with the core material, wherein the core material has a relatively higher refractive index than the lower cladding. Excess core material is removed to leave the channels filled with the core material and upper cladding is deposited over the channels that are filled with the core material.

The waveguide ends may be shaped into lens form or geometry by etching the ends of the waveguide to form a protrusion from the ends of the waveguide with a gradually reduced cross-sectional area. The waveguide is heated to or above a softening temperature resulting in substantially cone-shaped lens ends with smooth surfaces due to the surface tension in the core material.

The following references are cited to show related art: P. Kayoun, C. Puech, M. Papuchon, H. J. Arditty, "Improved Coupling Between Laser Diode and Single-Mode Fiber Tipped With A Chemically Etched Self-Centered Diffracting Element," Electronics Letters, Vol. 17, No. 12, pp. 400–402, 1981; M. Kawachi, T. Edahiro, H. Toba, "Microlens Formation on VAD Single-Mode Fiber Ends," Electronics Letters, Vol. 18, No. 2, pp. 71–72, 1982; D. S. Alles, "Trends in Laser Packaging," 40th Electronic Components and Technology Conference, May 20–23, 1990; and C. J. Sun, S. Sumida, S. Sakaguchi, T. Miyashita, "Circular Channel Waveguides and Lenses Formed From Rectangular Channel Waveguides," U.S. Pat. No. 5,064,266, 1991.

The foregoing and other objects and advantages will become more apparent when viewed in light of the accompanying drawings and the following description:

BRIEF DESCRIPTION OF THE DRAWINGS

FIGS. 2A–F illustrate the fabrication of "negative type" waveguides.

FIGS. 3A–E illustrate the fabrication of "positive type" waveguides.

DESCRIPTION OF THE PREFERRED EMBODIMENT(S)

Figure 1A:
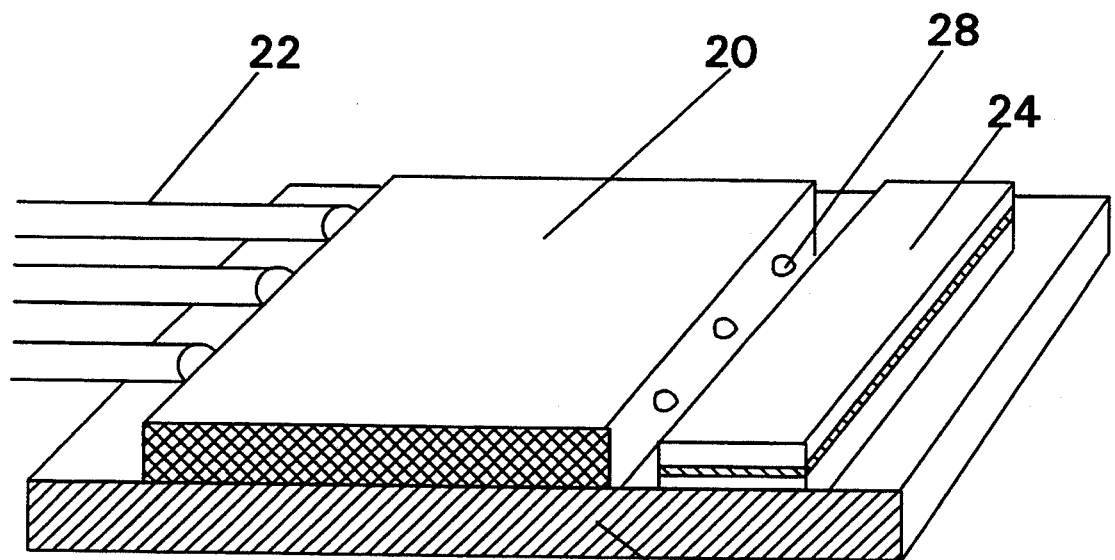
FIG. 1A is a perspective view of a waveguide circuit with lens ends in optical communication with an optical fiber or light detector and a laser diode array.
Figure 1B:
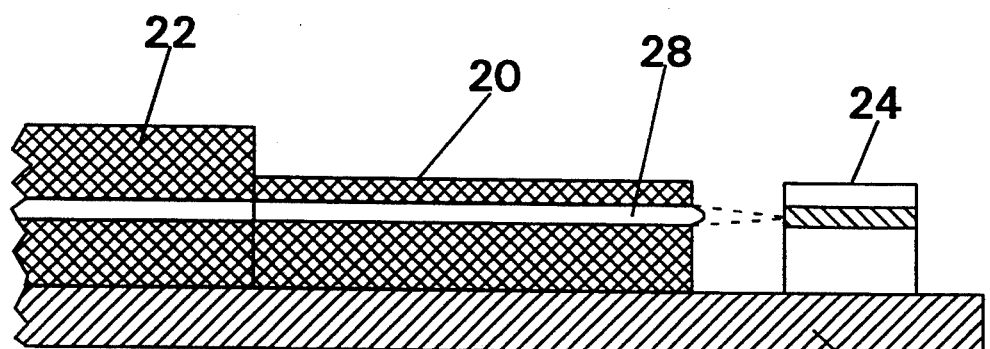
FIG. 1B is an elevational view of the waveguide circuit with lens ends shown in FIG. 1A.

The present invention enables the efficient optical coupling from light sources to waveguides and from waveguides to light detectors. The present invention will have practical application in fiber optic communication devices and optoelectronic integration devices. Referring now to the drawings, there is illustrated in FIGS. 1A and 1B a waveguide circuit array 20 with waveguides 28 with lens ends in optical communication with an optical fiber or light detector 22 and a laser diode array 24, which are on a substrate 26.

The fabrication of "negative type" waveguides is illustrated in FIGS. 2A–F. These waveguides can be fabricated from either a substrate 30 over which lower cladding 32 is deposited (FIG. 2A) or a substrate that is itself lower cladding 32 (FIG. 2B). One or more channels is formed in the lower cladding 32 as shown in FIG. 2C, wherein the channels define a waveguide circuit configuration. Core material 34 is deposited over the lower cladding 32 to fill the channels with the core material 34 as shown in FIG. 2D. The core material 34 has a relatively higher refractive index than the lower cladding 32. Excess core material 34 is removed by performing an etch-back thereby leaving the channels filled with the core material 34 as shown in FIG. 2E. As shown in FIG. 2F, upper cladding 36 is deposited over the channels filled with the core material 34, thereby forming a waveguide circuit 40. The waveguide fabricated in this manner is generally known as a "negative type" waveguide, which is a preferred embodiment of the present invention.

FIGS. 3A-E illustrate the fabrication of "positive type" waveguides. These waveguides can be fabricated from either a substrate 30 over which lower cladding 32 is deposited (FIG. 3A) or a substrate that is itself lower cladding 32 (FIG. 3B). Core material 34 is deposited over the lower cladding 32 as shown in FIG. 3C. The core material 34 has a relatively higher refractive index than the lower cladding 32. Pattern core ridges are formed by removing some of the core material 34 as shown in FIG. 3D. These pattern core ridges result in channels filled with the core material 34 when upper cladding 36 is deposited over the remaining core ridges and lower cladding 32, thereby forming a "positive type" waveguide circuit 40 as shown in FIG. 3E.

After the formation of a waveguide circuit 40, the end of the waveguide is shaped into a lens form or lens geometry as shown in FIGS. 4A-D. In a preferred embodiment, the lower cladding 32, upper cladding 36 and core 34 of the waveguide 40 are made of doped silica, wherein the core 34 contains Germanium dioxide (GeO$_2$) for raising the refractive index of the core 34. The end of the waveguide 40 is etched to form a protrusion 42 extending from the end of the waveguide 40 having a gradually reduced cross-sectional area. This etching may be accomplished by buffered HF solution or other suitable etching solution which allows the etching rate of doped silica glass to vary with the type of dopant and the dopant concentration. For example, GeO$_2$ doped core 34 is etched more slowly than the lower cladding 32 and upper cladding 36. The waveguide end is etched for a certain period of time depending on the type of etching solution used and the type and concentration of the dopants in the lower cladding 32, upper cladding 36 and the core 34.

Figures 4A, 4B, 4C, 4D:
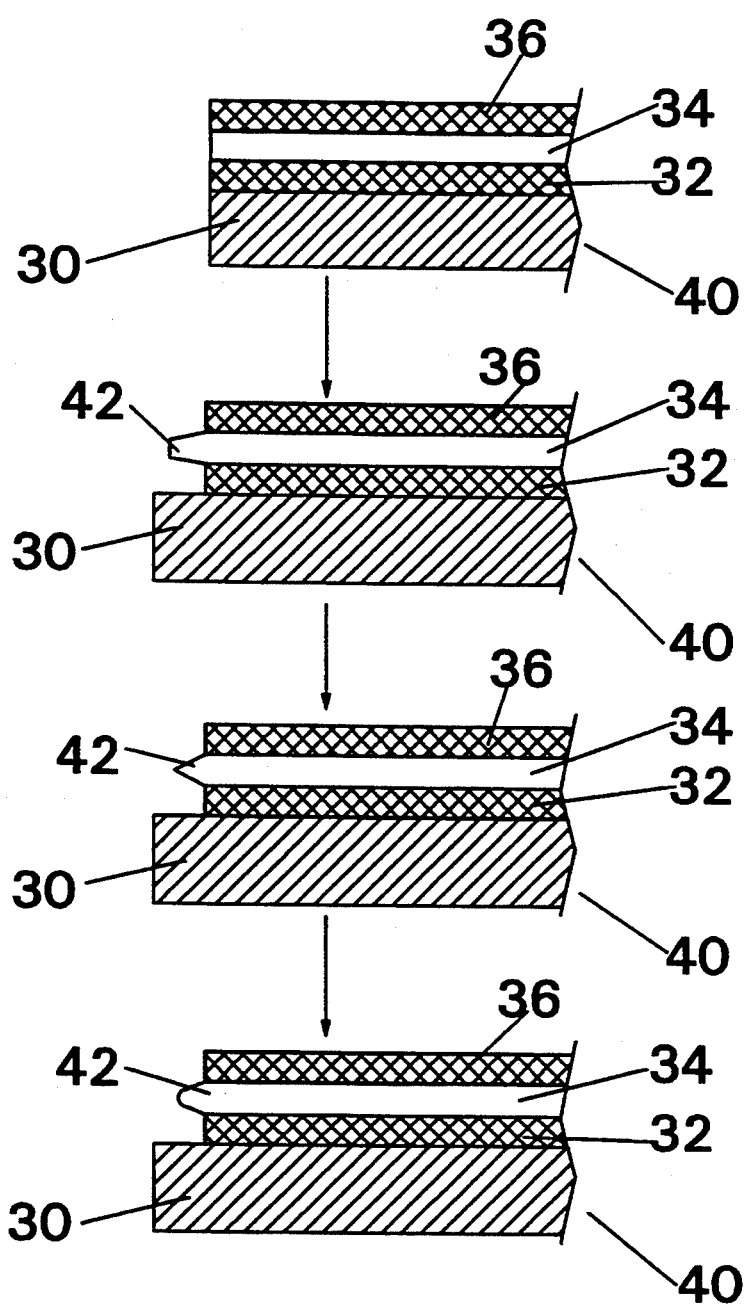
FIGS. 4A–D illustrate the shaping of waveguide ends into lens form in accordance with the present invention.

The protrusion 42 formed from the end of the waveguide 40 by the etching will have a gradually reduced cross-sectional area as shown in FIG. 4B. For rectangular channels in the waveguide 40, the waveguide end may be shaped into a substantially pyramid-shaped end after the waveguide 40 is etched. The shape of the protrusion 42 from the end of the waveguide 40 depends on the amount of time that the etching is allowed to take place, the shape of the core-filled channel and the dopants in the core material 34. In FIG. 4C, the etching was allowed to take place for a longer period of time than the etching shown in FIG. 4B, resulting in the protrusion 42 having a sharper profile.

After the protrusion 42 from the end of the waveguide 40 is formed by the etching, the waveguide circuit is heated to or above the glass softening temperature of the core material 34 resulting in surface tension in the core material 34 functioning to shape the protrusion 42 into a substantially cone-shaped lens end having a smooth surface as shown in FIG. 4D. "Softening temperature" is a common term used in the field and is defined in the "Handbook of Glass Property," by N. P. Binsal and R. H. Doremus, Academic Press, p. 223, 1986, as "The softening point of a glass is the temperature at which it has the viscosity of 107.6 poise. At this viscosity, a rod about 24 cm long and 0.7 mm in diameter elongates 1 mm/min under its own weight."

The time of heating and the temperature achieved are critical to the success of the present invention. The time necessary to heat and the maximum temperature of heating depend on the type of dopant used and the quantity of dopant in the core material 34.

The following two examples are provided to better explain the present invention but in no way should these examples be interpreted to limit the scope of the invention to the materials, quantities, and other specifics noted in the examples.

EXAMPLE 1

A lower cladding layer, core layer and upper cladding layer were made by flame hydrolysis deposition and the circuit channels were patterned by photolithography and reactive ion etching. The refractive index difference between the core and cladding layers was 0.39% (W). The cladding glass contained 0.5 mol % of P$_2$O$_5$, 2 mol % of B$_2$O$_3$, and the rest was SiO$_2$. The core contained 0.5 mol % P$_2$O$_5$, 8 mol % B$_2$O$_3$, and 4 mol % GeO$_2$. The upper cladding contained 1 mol % P$_2$O$_5$ and 4 mol % B$_2$O$_3$. Arrays of negative waveguides were etched in buffered HF for 270 minutes. After the etching, 3-4 mm pyramid-shaped core tips protruded from the waveguide endface. The buffered HF consisted of 49% HF and 40% NHF with ratio of 1:5. The etched waveguides were then heated to 1010° C. for 2 hours. Cone-shaped waveguide lens ends were formed after the heating and the cone-shaped lens ends extended about 3 mm from the waveguide endface.

EXAMPLE 2

This Example is similar to Example 1 except for: (1) the refractive index difference between core and cladding was 0.63% (W); (2) the waveguides were etched in buffered HF for four hours; and (3) the etched waveguides were then heated to 990° C. for two hours. The cone-shaped waveguide lens ends extended about 5-6 mm from the waveguide endface with a sharper profile than that observed in Example 1.

The results of Examples 1 and 2 show that lenses with different profiles can be made by varying the waveguide composition, buffered HF etching time and heating temperature. These variations are critical to the success of the present invention and allow for varying sizes and shapes of protrusions to be accomplished.

Figure 5A:
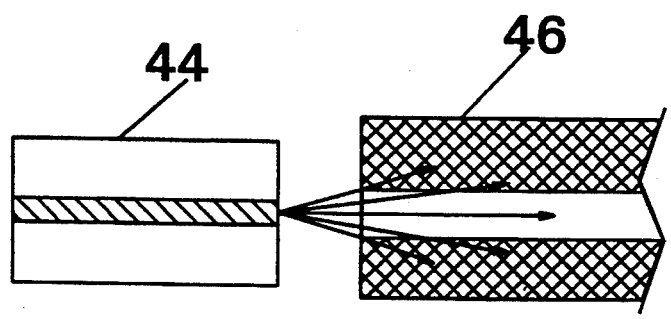
FIG. 5A illustrates light coupling from a laser diode to a regular waveguide.
Figure 5B:
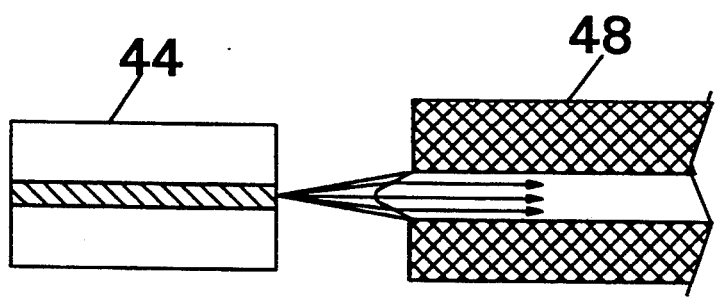
FIG. 5B illustrates light coupling from a laser diode to a lens-ended waveguide made in accordance with the present invention.

With the resulting substantially cone-shaped lens end protruding from the waveguide endface, the present invention enables the formation of low loss integrated optical assemblies and devices. FIG. 5A illustrates light coupling from a laser diode 44 to a regular waveguide 46 and FIG. 5B illustrates light coupling from a laser diode 44 to a waveguide with a lens endface 48. The waveguide with a lens endface 48 allows more light to be coupled into the lens-ended waveguide from the laser diode 44 or other light source than a regular waveguide 46 does. Similarly, an optical waveguide with ends of lens geometry couples more light into an optical fiber, light detector, or other similar device, than a regular waveguide does.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A method of making integrated optical circuits having a waveguide end of lens geometry, said method comprising the steps of:
   forming a channel type waveguide circuit on a substrate; and
   shaping the waveguide end into lens form.

2. A method of making integrated optical circuits having a waveguide end of lens geometry, said method comprising the steps of:
   (a) forming a waveguide circuit on a substrate by:
      providing a substrate as lower cladding or depositing lower cladding on a substrate;
      forming one or more channels in said lower cladding, said channel defining a waveguide circuit configuration;
      depositing core material over said lower cladding to fill said channel with the core material, said core material having a relatively higher refractive index than said lower cladding;
      removing the excess core material and leaving said channel filled with said core material; and
      depositing upper cladding over the channel filled with said core material and
   (b) shaping the waveguide end into lens form.

3. The method of claim 2, wherein said channel forming step is accomplished by photolithography and etching.

4. The method of claim 3, wherein said etching is dry or wet etching.

5. The method of claim 2, wherein a rectangular cross-section channel is formed by said channel forming step.

6. The method of claim 2, wherein said substrate comprises one or more of the group consisting of silicon, ceramics and fused silica.

7. The method of claim 2, wherein said core material is doped to raise its refractive index.

8. The method of claim 7, wherein said doped core material is silica glass doped with at least one of a group of dopants consisting of $GeO_2$, $B_2O_3$, $TiO_2$ and $P_2O_5$.

9. The method of claim 2, wherein said lower and upper cladding are silica glass doped with at least one of a group of dopants consisting of $GeO_2$, $B_2O_3$, $TiO_2$ and $P_2O_5$.

10. The method of claim 9, wherein said lower cladding has less dopant than said upper cladding.

11. The method of claim 2, wherein the step of removing the excess core material and leaving the channel filled with the core material is accomplished by performing an etch-back.

12. A method of making integrated optical circuits having a waveguide end of lens geometry, said method comprising the steps of:
   (a) forming a waveguide circuit on a substrate: and
   (b) shaping the waveguide end into lens form by:
      etching the end of the waveguide to form a protrusion from the end of the waveguide with a gradually reduced cross-sectional area; and
      heating said waveguide to or above the softening temperature of core material in said waveguide resulting in surface tension in said core material functioning to shape the protrusion into substantially cone-shaped lenses having a smooth surface.

13. The method of claim 12, wherein said etching is accomplished by buffered HF.

14. A method of making integrated optical circuits having a waveguide end of lens geometry, said method comprising the steps of:
   providing a substrate as lower cladding or depositing lower cladding on a substrate;
   forming one or more channels in said lower cladding, said channel defining a waveguide circuit configuration;
   depositing core material over said lower cladding to fill the channel with the core material, said core material having a relatively higher refractive index than said lower cladding;
   removing the excess core material and leaving the channel filled with said core material;
   depositing upper cladding over the channel filled with said core material, thereby forming a waveguide circuit;
   etching the end of the waveguide to form a protrusion from the end of the waveguide with a gradually reduced cross-sectional area; and
   heating said waveguide to or above the softening temperature of said core material resulting in surface tension in said core material functioning to shape the protrusion into substantially cone-shaped lenses having a smooth surface.

15. An optical circuit having a waveguide end of lens geometry, comprising:
   a substrate suitable for forming a waveguide thereon, said substrate having lower cladding deposited thereon or said substrate being lower cladding;
   a channel waveguide formed on said substrate, said channel waveguide formed from doped core material between lower cladding and upper cladding; and
   said channel waveguide having an end being substantially cone-shaped in lens form.

16. The optical circuit of claim 15, wherein said core material has a relatively higher refractive index than said lower and upper cladding.

17. The optical circuit of claim 15, wherein the substantially cone-shaped end of said waveguide is formed by etching the end of the waveguide to form a protrusion from the end of the waveguide with a gradually reduced cross-sectional area and heating said waveguide to or above the softening temperature of said core material resulting in surface tension in said core material functioning to shape the protrusion into a substantially cone-shaped lens end having a smooth surface.

18. The optical circuit of claim 15, wherein said substrate comprises one or more of the group consisting of silicon, ceramics and fused silica.

19. The optical circuit of claim 15, wherein said core material is doped to raise its refractive index.

20. The optical circuit of claim 19, wherein said doped core material is silica glass doped with at least one of a group of dopants consisting of $GeO_2$, $B_2O_3$, $TiO_2$ and $P_2O_5$.

21. The optical circuit of claim 15, wherein said lower and upper cladding are silica glass doped with at least one of a group of dopants consisting of $GeO_2$, $B_2O_3$, $TiO_2$ and $P_2O_5$.

22. The optical circuit of claim 21, wherein said lower cladding has less dopant than said upper cladding.

23. A method of making integrated optical circuits having a waveguide end of cone-shaped lens geometry, said method comprising the steps of:
   forming a waveguide circuit on a substrate; and
   shaping the waveguide end into cone-shaped lens form.

24. A method of making integrated optical circuits having a waveguide end of cone-shaped lens geometry, said method comprising the steps of:
   forming a channel type waveguide circuit on a substrate; and
   shaping the waveguide end into cone-shaped lens form.

25. An optical circuit having a waveguide end of lens geometry, comprising:
   a substrate suitable for forming a waveguide thereon, said substrate having lower cladding deposited thereon or said substrate being lower cladding;
   a waveguide formed on said substrate, said waveguide formed from doped core material between lower cladding and upper cladding; and
   said waveguide having an end being substantially cone-shaped in lens form.

* * * * *